(12) United States Patent
Weber et al.

(10) Patent No.: US 9,035,537 B2
(45) Date of Patent: May 19, 2015

(54) COST EFFECTIVE BROADBAND TRANSDUCER ASSEMBLY AND METHOD OF USE

(71) Applicants: Ronald Gene Weber, Owasso, OK (US); Nathan Blake Weber, Tulsa, OK (US)

(72) Inventors: Ronald Gene Weber, Owasso, OK (US); Nathan Blake Weber, Tulsa, OK (US)

(73) Assignee: RGW Innovations, LLC, Owasso, OK (US)

( * ) Notice: Subject to any disclaimer, the term of this patent is extended or adjusted under 35 U.S.C. 154(b) by 0 days.

(21) Appl. No.: 14/211,940

(22) Filed: Mar. 14, 2014

(65) Prior Publication Data
US 2014/0306579 A1    Oct. 16, 2014

Related U.S. Application Data

(60) Provisional application No. 61/788,469, filed on Mar. 15, 2013.

(51) Int. Cl.
| | |
|---|---|
| *B06B 1/06* | (2006.01) |
| *G01S 15/02* | (2006.01) |
| *G01S 7/521* | (2006.01) |
| *G01S 15/89* | (2006.01) |
| *B06B 1/08* | (2006.01) |
| *G10K 11/00* | (2006.01) |

(52) U.S. Cl.
CPC ............... *B06B 1/0603* (2013.01); *G01S 15/02* (2013.01); *G01S 7/521* (2013.01); *G01S 15/89* (2013.01); *B06B 1/08* (2013.01); *B06B 1/0651* (2013.01); *G10K 11/006* (2013.01)

(58) Field of Classification Search
CPC .. B06B 1/0644; B06B 1/0648; B06B 1/0651; B06B 1/0655; B06B 1/0677; B06B 1/0681
USPC ................................ 310/322, 334, 335, 337
See application file for complete search history.

(56) References Cited

U.S. PATENT DOCUMENTS

| | | | |
|---|---|---|---|
| 3,753,058 A | 8/1973 | Edson | |
| 3,953,828 A | 4/1976 | Cook | |
| 4,439,847 A | 3/1984 | Massa | |
| 4,604,542 A | 8/1986 | Thompson | |
| 4,633,119 A | 12/1986 | Thompson | |
| 4,701,658 A | 10/1987 | Ringermacher et al. | |
| 4,823,327 A | 4/1989 | Hilmers | |
| 4,916,675 A | 4/1990 | Hoering | |
| 5,121,628 A * | 6/1992 | Merkl et al. | 310/334 |

(Continued)

OTHER PUBLICATIONS

Raymarine CPT-60 Manual.

*Primary Examiner* — Derek Rosenau
(74) *Attorney, Agent, or Firm* — Millikin Intellectual Property Law, PLLC

(57) ABSTRACT

A transducer assembly for transmitting broadband sonar beams and receiving broadband sonar returned echoes with a low-cost transducer element mounted into a low-cost acoustic structure. By using a transducer element which is sufficiently thin, broadband can be achieved at a significant cost savings over existing methods and devices. Since the transducer element is sufficiently thin, a large portion of the signal energy is coupled transversely into the acoustic structure, resulting in a heavy acoustic load on the transducer element which in turn results in broadband operation. Broadband operation may be enhanced by at least partially enclosing the sufficiently thin transducer element within an aperture and/or a cap.

55 Claims, 13 Drawing Sheets

(56) References Cited

U.S. PATENT DOCUMENTS

| | | | |
|---|---|---|---|
| 5,176,140 A * | 1/1993 | Kami et al. | 310/336 |
| 5,229,980 A | 7/1993 | Pawela | |
| 5,343,443 A | 8/1994 | Merewether | |
| 6,617,765 B1 | 9/2003 | Lagler et al. | |
| 6,822,373 B1 | 11/2004 | Butler | |
| 6,984,923 B1 | 1/2006 | Walsh et al. | |
| 7,019,439 B2 | 3/2006 | Decastro et al. | |
| 7,019,621 B2 * | 3/2006 | Woodard et al. | 310/334 |
| 8,027,224 B2 | 9/2011 | Brown et al. | |
| 2001/0031922 A1 | 10/2001 | Weng et al. | |
| 2006/0023570 A1 | 2/2006 | Betts | |
| 2007/0227435 A1 | 10/2007 | Herold | |
| 2010/0103775 A1 * | 4/2010 | Betts et al. | 367/88 |
| 2013/0042687 A1 | 2/2013 | Kulls et al. | |

* cited by examiner

COST EFFECTIVE BROADBAND TRANSDUCER ASSEMBLY AND METHOD OF USE

CROSS REFERENCE TO RELATED APPLICATIONS

This application claims priority to provisional patent application Ser. No. 61/788,469 which is entitled Cost Effective Broadband Sonar Transducer, filed Mar. 15, 2013, the entirety of which is incorporated herein by reference.

TECHNICAL FIELD OF THE INVENTION

The present invention relates generally to electroacoustic transducers and more particularly to ultrasonic broadband transducer assemblies used in marine applications. A method of using a broadband transducer assembly in marine environments also is provided.

SUMMARY OF THE INVENTION

The present invention is directed to an acoustic structure operable for the purpose of imaging in marine applications, the acoustic structure having a quality factor (Q) and a bandwidth associated with the quality factor (Q). The acoustic structure comprises a sufficiently thin transducer element for transmitting and receiving acoustic signals, the sufficiently thin transducer element having a transverse resonant frequency and a diameter and a thickness and wherein the ratio of the diameter of the transducer element to the thickness of the transducer element ranges from 4.5 to 5. The acoustic structure further comprises a base to which the sufficiently thin transducer element is securable; wherein the sufficiently thin transducer element produces transverse vibrations which result in loading of the transducer element and wherein the loading of the transducer element results in broadening of the bandwidth of the acoustic structure so that the acoustic structure has a quality factor (Q) of 5 or less and wherein the bandwidth of the acoustic structure includes the transverse resonant frequency of the transducer element.

The present invention further is directed to a transducer assembly operable for the purpose of imaging in marine applications. The transducer assembly comprises an acoustic structure having quality factor (Q) and a bandwidth associated with the quality factor (Q). The transducer element further comprises a base and a sufficiently thin transducer element having a transverse resonant frequency and a diameter and a thickness and wherein the ratio of the diameter of the transducer element to the thickness of the transducer element ranges from 4.5 to 75. The sufficiently thin transducer element is securable to the base of the acoustic structure, and the sufficiently thin transducer element produces transverse vibrations which result in loading of the transducer element and wherein the loading of the transducer element results in broadening of the bandwidth of the acoustic structure so that the acoustic structure has a quality factor (Q) of 5 or less.

Finally, the present invention is directed to a method of imaging marine environments. The method comprises the steps of transmitting an acoustic signal into a sufficiently thin transducer element, the sufficiently thin transducer element having a diameter and a thickness and wherein the ratio of the diameter of the transducer element to the thickness of the transducer element ranges from 4.5 to 75, and producing transverse vibrations of the sufficiently thin transducer element and thereby loading the sufficiently thin transducer element to produce a quality factor (Q) of 5 or less.

The foregoing and other objects, features, and advantages of the invention will appear more fully hereinafter from a consideration of the detailed description that follows.

DETAILED DESCRIPTION OF THE INVENTION

Figure 1:
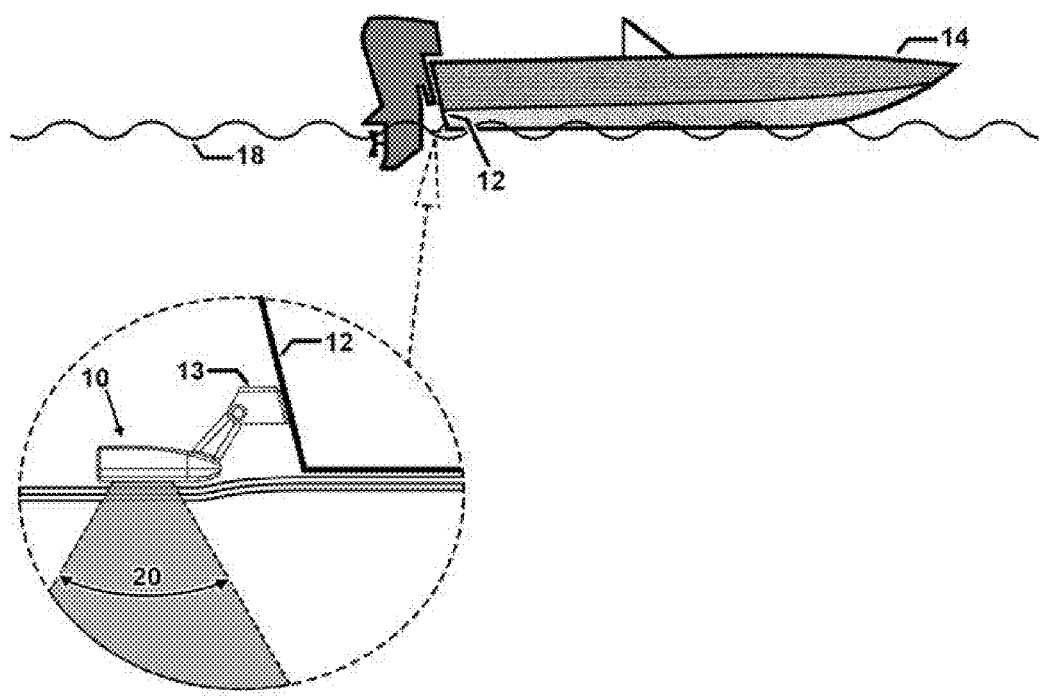
FIG. 1 illustrates an exploded view of an exemplary configuration by which an embodiment of a transducer assembly of the present invention is mounted to the transom of a watercraft.

Broadband transducers are electroacoustic devices used to increase sonar resolution and definition of products and have application, for example, in scanning sonar, three-dimensional sonar, echo sounders and sonar-GPS combinations. These devices can determine the depth of the marine floor, locate fish, identify other submerged targets, locate structure, show contours, avoid collisions and produce underwater images and the like.

Conventional broadband transducers used in military and commercial applications are too expensive to incorporate into most fish finding systems. While broadband transducers offer new capabilities for these devices, a conventional broadband fishfinder must meet the requirements for broadband in each aspect of the device, including the transducer, transmitter, receiver, and signal-processing-software. Most broadband transducers are comprised of porous ceramic elements or composite ceramic elements, which are expensive and contribute to the high cost of broadband devices. These requisite materials and components make broadband fishfinders cost prohibitive for many commercial and recreational marine activities.

Conventional narrowband fishfinders incorporate transducers that operate within a limited range of active frequencies. Lead zirconate titanate ($Pb[Zr_xTi_{1-x}]O_3$ or "PZT") is a piezoelectric ceramic material widely used in transducers. However, the range of active resonant frequencies of this PZT ceramic material are extremely narrow. Due to the discontinuity between the acoustic impedance of the piezoelectric ceramic material comprising the transducer and the surrounding environment, the bandwidth of conventional narrowband fishfinders typically have a Quality Factor ("Q Factor") of about 15 and above. These conventional narrowband devices generally are useful in freshwater and some saltwater environments but are limited in capability as compared to broadband devices, which offer many advantages.

Various tactics have been employed in attempts to create broadband transducers for use in marine applications, including the use of composite or porous piezoelectric ceramic materials. Composite PZT ceramic material ("composite PZT") comprised of epoxy, plastic and rubber, are placed into a homogeneous mixture with small pieces of PZT ceramic to form a monolithic transducer. The composite PZT transducer will have an acoustic impedance between PZT and epoxy, moving the acoustic impedance closer to that of water and creating a broadband effect. Porous piezoelectric materials ("porous PZT") are used in commercial and military sonar applications and medical electronics. To create a porous ceramic material, the PZT is mixed with select powders and is heated, leaving microscopic voids in the PZT. The voids reduce specific gravity of the PZT ceramic material, thereby moving the acoustic impedance of the device closer to that of water and achieving broadband results. Both porous PZT and composite PZT are extremely expensive due to material and manufacturing costs. Other methods of achieving broadband include the use of head and tail masses, also impedance matching layers are placed between the piezoelectric element and water.

The present invention overcomes these problems of expense and complexity. The present invention comprises a cost-effective broadband transducer assembly that not only reduces the cost of existing broadband fishfinder systems but, due to the low cost of the transducer, will allow all fishfinding systems to operate with broadband. The present invention achieves broadband operation by using an internally-housed, low cost transducer element which is sufficiently thin, as described herein, thereby generating a relatively large amount of transverse vibration in the transducer element and increasing the load between the transducer element and an acoustic structure. Broadband operation may be enhanced by at least partially enclosing the transducer element with a cap or within an aperture sized to receive the transducer element, which has the effect of increasing the load between the transducer element and the acoustic structure. As used herein, the term "broadband" and the phrases "broadband operation" or "operates within broadband" and the like are used interchangeably to mean having a Q Factor of about 5 or less.

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are described herein. All references cited herein, including published or corresponding U.S. or foreign patent applications, issued U.S. or foreign patents, and any other references, are each incorporated by reference in their entireties, including all data, tables, figures, and text presented in the cited references.

Turning now to the drawings in general and to FIG. 1 in particular, there is shown therein an embodiment of the broadband transducer assembly 10 of the present invention mounted to the transom 12 of a watercraft 14 or other vessel for use in marine applications. As used herein, "marine" and "marine applications" are used interchangeably to refer to activities and/or applications involving or relating to bodies or accumulations water, whether fresh water or salt water, including, without limitation, oceans, seas, lakes, ponds, rivers, streams, springs, creeks, gulfs, sounds, harbors, coves, channels, lagoons and the like. The transducer assembly 10 may be affixed to the watercraft 14 via known methods, such as mounting bracket 13, although it will be appreciated that other embodiments and other watercraft mounting methods are possible. For example, the transducer assembly 10 may be affixed via through-hull-mounting, in-hull-mounting, trolling-motor-mounting, pole-mounting, adhesives and the like. Additionally, the transducer assembly 10 may be used without affixation to any watercraft or other device and simply may be floated or suspended on or near the surface of the water 18 where it is to be employed, for example, in marine activities such as ice fishing or from a boathouse and other activities where physical connection with a vessel or watercraft is neither useful nor desirable.

The broadband transducer assembly 10 optimally is used such that sonar beam 20 emitted from the transducer assembly is generally perpendicular to the water surface 18. However, it will be appreciated that the present invention also may be used with the transducer assembly 10 in any orientation with respect to the water surface 18 so long as the sonar beam 20 is emitted from transducer assembly 10 in a direction that is within the water. For example, the broadband transducer assembly 10 may be positioned so that the sonar beam 20 is emitted at a 45 degree angle with respect to the surface of water 18 or even parallel with respect to surface 18, so long as the sonar beam is emitted within the water.

Figure 2:
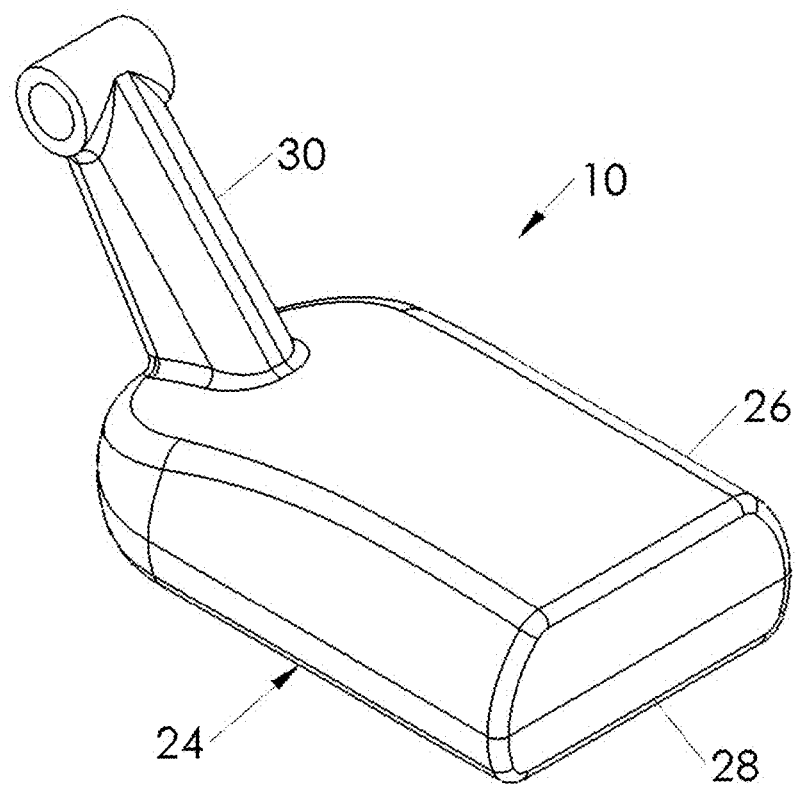
FIG. 2 shows an isometric view of an exemplary broadband transducer assembly of the present invention.
Figure 3:
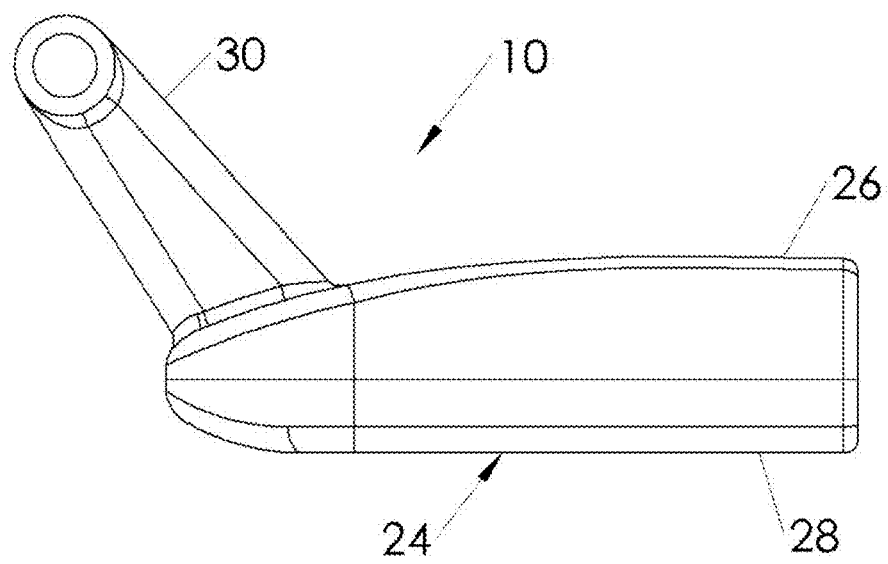
FIG. 3 is a side elevation view of an exemplary broadband transducer assembly of the present invention.
Figure 4:
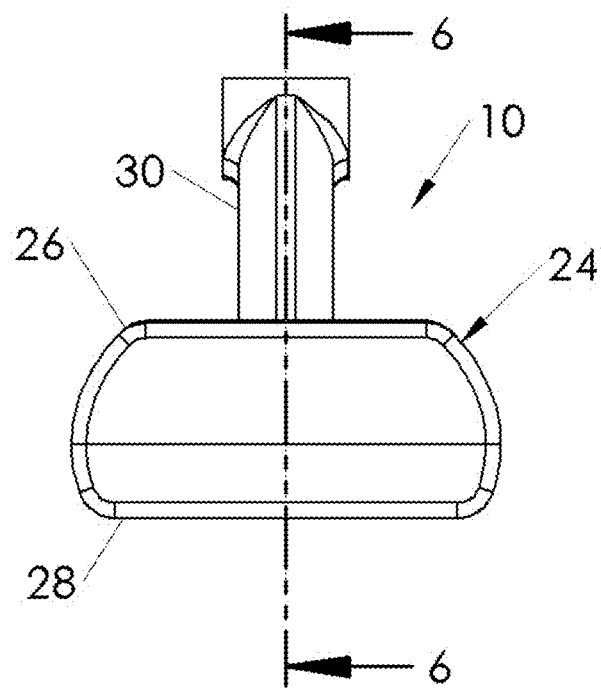
FIG. 4 is a rear elevation view of an exemplary broadband transducer assembly of the present invention.

Turning now to FIGS. 2 through 4, the transducer assembly 10 comprises a housing 24. In one embodiment of the invention, the housing 24 comprises a top surface 26, a bottom surface 28 and a connector 30. There are many types of brackets, clamps, struts, fixtures and other connectors 30 appropriate for use in mounting the transducer assembly 10 to the watercraft 14 or other vessel or device, depending upon the desired application. As aforementioned, the transducer assembly 10 need not be connected to another device or vessel to achieve optimal operation, so the connector 30 is optional.

The housing 24 may be of any shape that adequately stores the interior components, yet to be described. In one embodiment of the invention, the housing 24 is comprised of interlocking top and bottom surfaces 26 and 28, respectively, which are securely connected to protect the interior components of the broadband transducer assembly 10 from water, dust, contaminants and other foreign materials, particles or objects. It will be appreciated that the housing 24 may be constructed of multiple components or comprise a single, integrally-formed structure having a top surface 26 and bottom surface 28.

The housing 24 may be comprised of a variety of materials that preferably impart properties of impact resistance, toughness and water-resistance. Some such materials include plastics and metals. Examples of plastic materials suitable for construction of the housing 24 include polypropylene, delrin, polycarbonate, urethane, polyethylene, polystyrene, nylon, acrylic, polyvinylchloride and ultem. In one embodiment of the invention, the housing 24 of the broadband transducer assembly 10 is comprised of acrylonitrile butadiene styrene ("ABS") plastic. The housing 24 also may be constructed of metals, such as bronze, brass, aluminum or steel. Alternatively, the housing 24 may be constructed from a combination of materials. The material comprising the housing 24 should be selected so as to yield the most desirable characteristics of acoustic performance, strength, durability and cost-effectiveness for the particular application.

Figure 5:
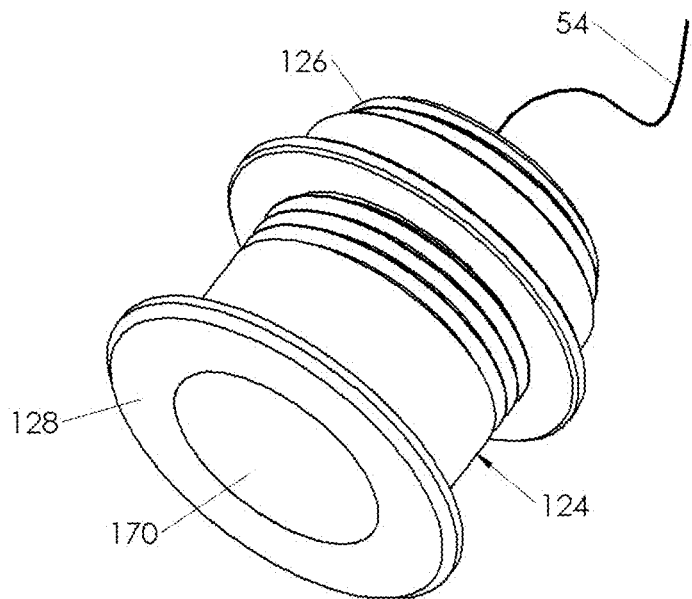
FIG. 5 is a perspective view of an alternative housing embodiment of the broadband transducer assembly of the present invention, having a window over at least a portion of the acoustic element.

In an alternative embodiment, the housing 124 is generally tubular, as shown in FIG. 5, forming a top surface 126 and a bottom surface 128, and may be constructed from metal. An acoustic structure 36 (not shown in FIG. 5) is acoustically isolated within the housing 124. Longitudinal waves or the sonar beam 20 from an acoustic structure, yet to be described, are coupled into water through an acoustic window 170, made of urethane or similar material.

Figure 6:
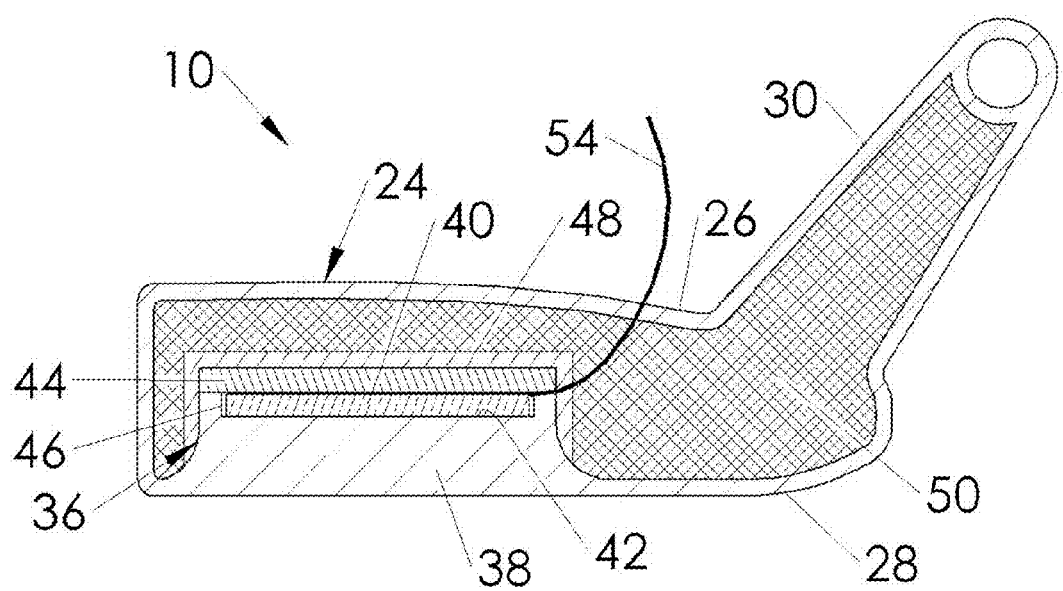
FIG. 6 is a cross-sectional view of an exemplary broadband transducer assembly of present invention, taken along line 6-6 of FIG. 4.

Turning now to FIGS. 6 and 7A through 7C, the broadband transducer assembly of the present invention further comprises an acoustic structure 36. FIG. 6 illustrates therein a cross-section of an embodiment of the broadband transducer assembly 10 taken long line 6-6 of FIG. 4, wherein an exemplary acoustic structure 36 of the present invention readily is seen. The acoustic structure 36 comprises a base 38 and a transducer element 40. It will be appreciated that the base 38 of the acoustic structure 36 may take any form suitable for supporting the transducer element 40. In one embodiment of the invention, shown in FIG. 7A, the base 38 of acoustic structure 36 comprises a generally level support for the transducer element 40.

Figure 7A:
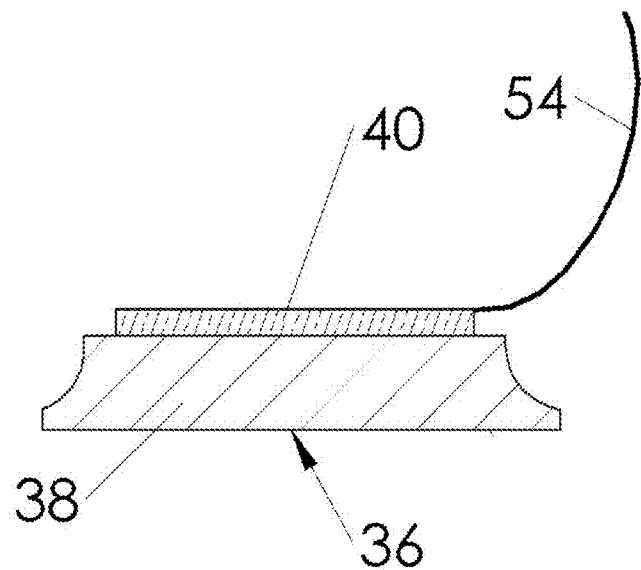
FIG. 7A illustrates a cross-sectional view of an exemplary acoustic structure of the broadband transducer assembly of the present invention, the acoustic structure comprising a base and a transducer element.
Figure 7B:
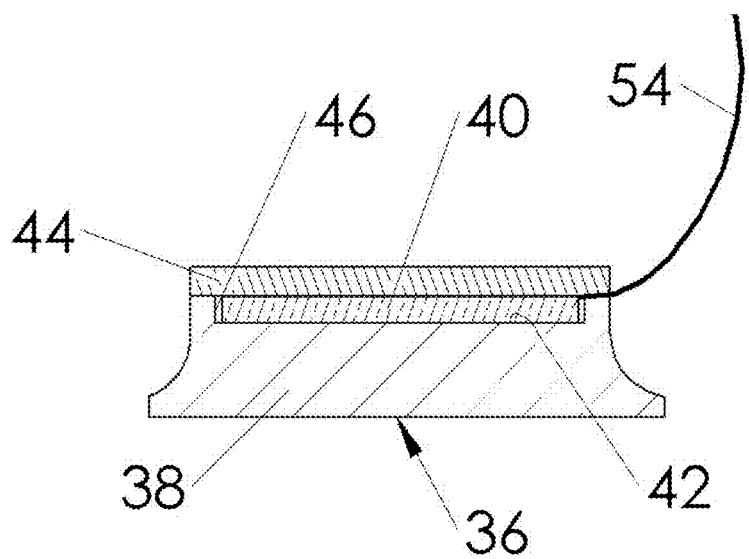
FIG. 7B illustrates a cross-sectional view of an alternative exemplary acoustic structure wherein an aperture and cap at least partially enclose the transducer element.
Figure 7C:
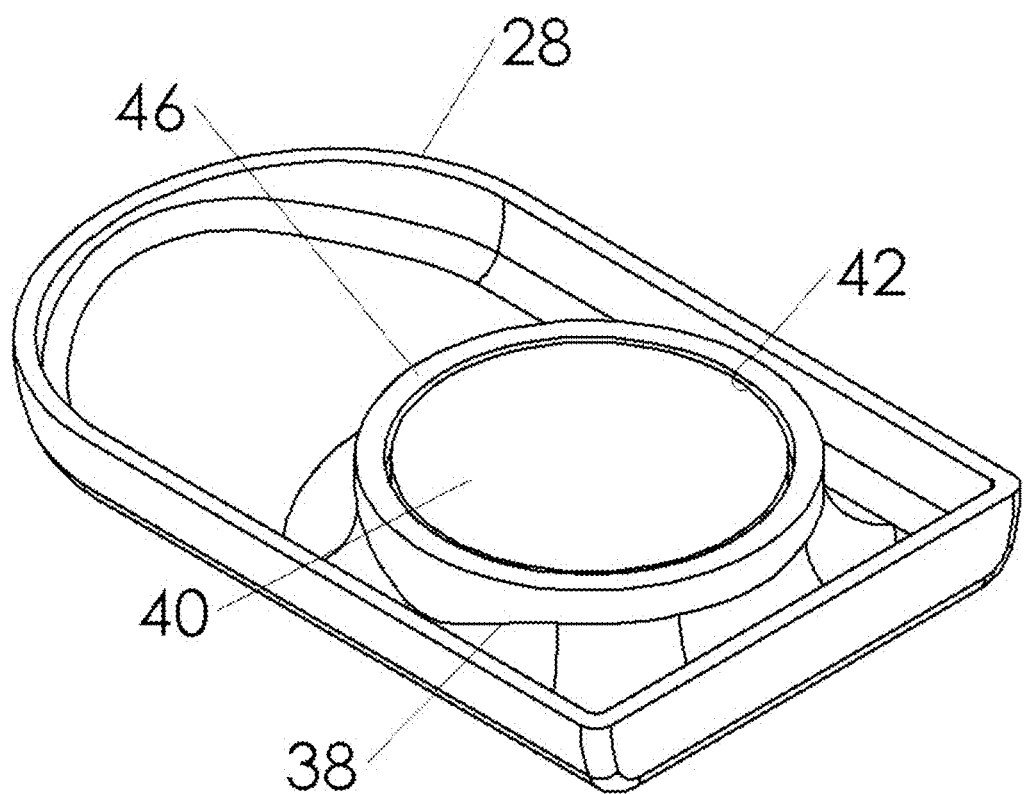
FIG. 7C shows a perspective view of the bottom surface of an exemplary housing of the broadband transducer assembly of the present invention, wherein the base of the acoustic structure forms an aperture for receiving the transducer element.

Alternatively, the base 38 of the acoustic structure 36 may form an aperture 42 for receiving the transducer element 40, as illustrated in FIGS. 6, 7B and 7C. The depth of the aperture 42 preferably approximates the thickness of the transducer element 40. The aperture 42 need not be formed by a continuous sidewall 46 or sidewalls, depending upon the configuration, and may be formed, for example, with intermittent breaks in the sidewall. Consequently, the sidewall 46 of aperture 42 either may directly contact the transducer element 40 or any filler materials therebetween, such as an adhesive or potting compound. Typically, though not necessarily, a gap between the sidewall 46 of the aperture 42 and the transducer element 40 would be filled with an adhesive that is also used to secure the transducer element to the base 38.

The aperture 42 may be formed integrally with or from the base 38. The aperture 42 may be formed from the same material as the base 38 or from another material. In one embodiment of the invention, the base 38 and the sidewall 46 forming the aperture 42 are formed as an integral unit from ABS. It will be appreciated that the aperture 42 may be formed from a separate component that is then connected to the base 38.

The base 38 and aperture 42 may comprise the same material or different materials, among which include ABS, nylon, polyethylene, polystyrene, polyvinylchloride, polypropylene, epoxy resin, vinyl ester resin, polyester resin, acrylic, delrin, polycarbonate, ultem and combinations thereof.

The acoustic structure further may comprise a cap 44, which may be employed in conjunction with the aperture 42 or without the aperture. The optional cap 44 serves a variety of purposes, one of which is to provide additional loading of the transducer element 40. The cap 44 also reduces side lobes in the beam pattern. It will be appreciated that the broadband transducer assembly 10 of the present invention achieves broadband without the cap 44. The cap 44 may be used in conjunction with the aperture 42 to completely enclose the transducer element 40. The cap 44 may also be positioned atop of transducer element 40 without positioning the transducer element within the aperture 42. The cap 44 may be formed as an integral part of the aperture 42 or as a separate component which is attached to or supported above or on the aperture 42. It is not necessary that the cap 44 completely cover the transducer element 40 to constrict the transverse vibrations of the transducer element, and to that end the cap may only partially cover or enclose the transducer element.

As shown in FIG. 6, the base 38 of the acoustic structure 36 may be integrally formed with bottom surface 28 of housing 24. It will be appreciated, however, that the base 38 of acoustic structure 36 may comprise a discrete article separate from the bottom surface 28 of housing 24. In one embodiment of the invention, the base 38 and optional cap 44 are made from ABS plastic, but other suitable materials such as nylon, polyethylene, polystyrene, polyvinylchloride, polypropylene, epoxy resin, vinyl ester resin, polyester resin, acrylic, delrin, polycarbonate, or ultem may be used to construct the base. In some embodiments, the base 38 or acoustic structure 36 may be constructed from the same material or materials as the housing 24, ABS for example, or the housing and base may be constructed of different materials. Furthermore, the acoustic structure 36 may be constructed from multiple materials so as to yield the most desirable characteristics of acoustic performance, strength, durability, and cost effectiveness. When the base 38 and housing 24 are not integrally formed, the based is secured to the bottom surface 28 of the housing with adhesives or solvents, such as epoxy, vinyl ester, methyl ethyl ketone or acetone, which do not or only minimally acoustically impede vibrations from the acoustic structure 36 into the housing.

While the acoustic structure 36 often is elliptical, the shape and design of the acoustic structure is not limited to an elliptical profile. Circular, rectangular, polygonal or free-form profiles could be used to tune the desired resonant modes of the transducer assembly 10. The acoustic structure 36 could be constructed in any shape and dimension to achieve the desired tuning and minimize the effect of resonant characteristics of the components of the broadband transducer assembly 10.

With continuing reference to FIGS. 6 and 7A through 7C, the acoustic structure 36 is at least partially surrounded by an isolation material 48 which serves to minimize radiation of acoustic signals from the acoustic structure into the housing 24, excepting the bottom surface 28 of the housing. To this end, and with the exception of the bottom surface 28 of the housing 24, the acoustic structure 36 is isolated from the other components of the transducer assembly 10 by an isolation material 48. The isolation material 48 may be any material that creates discontinuity in acoustic impedance so that acoustic energy remains within the acoustic structure 36 or passes into and through the bottom surface 28 of housing 24. Some materials suitable for this purpose include foam, cork, vacuum, air and the like. The isolation material 48 reduces coupling of acoustic signals from the acoustic structure 36 into other parts of the housing 24 except at the base 38 of the acoustic structure.

Further, in order to impart rigidity and durability to the both the transducer assembly 10 and the housing 24, the housing may be filled with a potting material 50, such as epoxy or rigid foam, which at least partially surrounds the acoustic structure 36. In some embodiments, the isolation material 48 and potting material 50 may be combined into a single item, such as a rigid cast-in-place foam which would furnish both the isolation and potting functions.

To achieve optimal performance of the transducer assembly 10, certain components of the transducer assembly must be designed properly for the application. One of these important characteristics includes the tuning of the acoustic structure 36. The acoustic structure 36 is tuned through appropriate selection of the materials, shape, diameter, thickness and dimensions of the components of the acoustic structure. Nevertheless, while these characteristics are important to performance, they alone will not result in broadband operation. A sufficiently thin transducer element 40 is required to achieve broadband operation.

With continuing reference to FIGS. 6 and 7A through 7C, the transducer element 40 of the broadband transducer assembly 10 of the present invention now will be described. The transducer element 40 comprises a piezoelectric material or a magnetostrictive material. In one embodiment of the invention, the transducer element is a piezoelectric material selected from the group consisting of PZT (lead zirconium titanate, $(Pb[Zr_XTi_{1-X}]O_3)$) or barium titanate $(BaTiO_3)$. In one embodiment of the invention, the piezoelectric material preferably comprises PZT.

The transducer element 40 is of any shape to be accommodated within the acoustic structure 36 and the housing 24. The transducer assembly 10 of the present invention achieves broadband by employing a sufficiently thin transducer element 40, in operation with the base 38 of acoustic structure 36. The extent to which the transducer element 40 is sufficiently thin can be expressed as the diameter-to-thickness (DTT) ratio of the transducer element. For a circular transducer element 40, the diameter thereof is clearly identifiable. For a non-circular transducer element 40, whether regular or irregular in shape, such as a rectangular, elliptical or polygonal, the characteristic length of the element is substituted for the diameter. As used herein, the term "DTT ratio" will be used to represent all scenarios.

A range of DTT ratios achieve broadband operation in the present invention. For example, a transducer element 40 which has a DTT ratio of 9 (diameter is 9 times the thickness) or greater will result in broadband operation when included as part of a proper acoustic structure 36. As the DTT ratio gets smaller, i.e. as the transducer element 40 gets thicker and/or smaller in diameter, the amount of transverse vibration in the transducer element decreases, causing less loading between the transducer element and the base 38 of acoustic structure 36, thus narrowing the bandwidth.

Typically, a transducer element 40 having a large DTT ratio of 75 or greater should exhibit broadband operation, although there is a practical upper limit to the DTT ratio for sonar and fishfinder applications. First, as the DTT ratio increases (as the element gets thinner with respect to the diameter) the amount of transmit power which can be input into the transducer element 40 without damaging it is reduced. If the transducer element 40 is too thin, it will not be able to handle the required transmit power to produce the desired results in a sonar or fishfinder application. This sets a practical lower limit to the thickness of the element. Second, as the DTT ratio increases, if a reasonable thickness is maintained, the diameter will also increase. Since the present invention operates the transducer element 40 in the transverse (or radial) mode, larger diameters will result in lower operational frequencies. Center operational frequencies below 20 kHz are not typically useful for sonar and fish-finder applications. This sets a practical upper limit to the diameter of the element. Having a practical lower limit to the element thickness and a practical upper limit to the element diameter (or characteristic length) effectively bounds the practical upper limit of DTT ratios. Preferably, the center frequency of the broadband operation of the broadband assembly of the present invention ranges from about 20 kHz to about 250 kHz.

Figure 8:
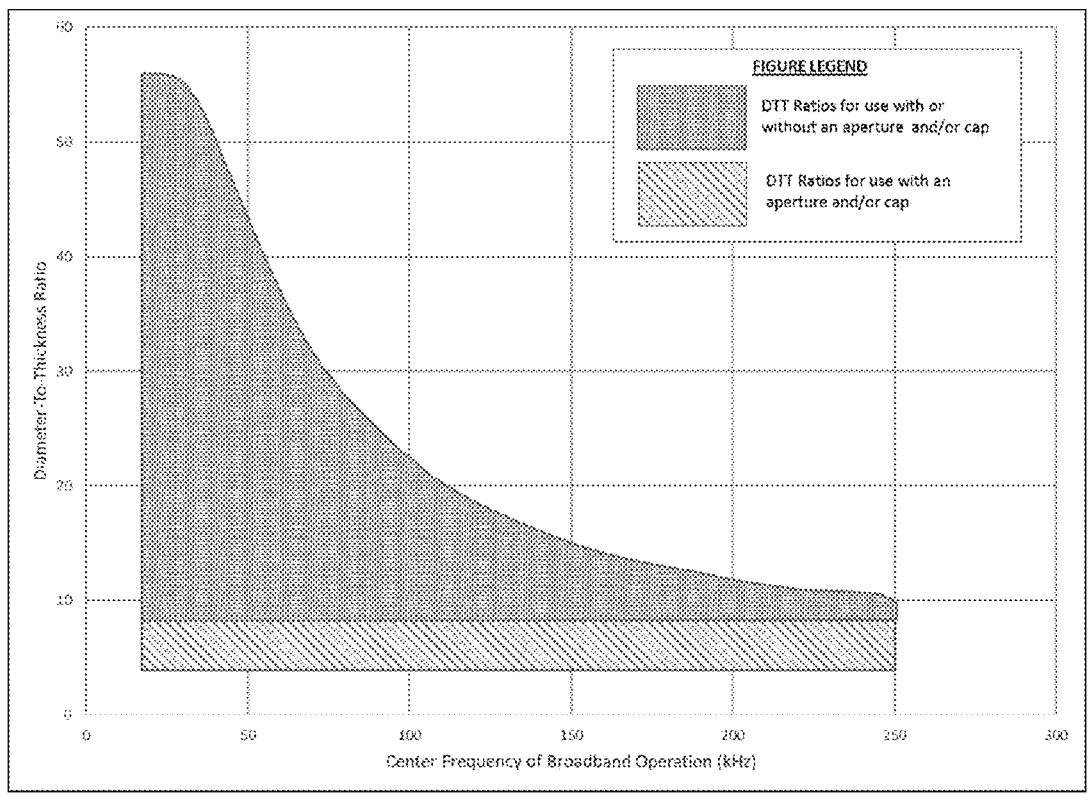
FIG. 8 is a graph illustrating favorable ranges of diameter-to-thickness ratios of transducer elements of the broadband transducer assembly of the present invention, both with and without an aperture and/or cap.

FIG. 8 illustrates some preferred DTT ratios of the transducer element 40 based on operational frequency of the broadband transducer assembly 10. The graph in FIG. 8 plots the DTT ratio of the transducer element 40 on the y axis versus the center frequency of broadband operation of the broadband transducer assembly 10 in operation, on the x axis. The expected useful DTT ratio of the transducer element 40 of the broadband transducer assembly 10 ranges from about 9 to about 55. A preferred range of DTT ratios exists based on the most favorable combination of transducer element 40 operational frequency, transducer element 40 bandwidth, transmit power capability, size and cost. Due to these factors, the most preferable DTT ratio range will be different based on the operational frequency of the transducer element. It will be appreciated that the transducer element 40 of the acoustic structure 36 is not limited to the DTT ratios shown in FIG. 8, although it is anticipated that a majority of viable DTT ratios of the transducer element will fall within this range.

The acoustic structure 36 need not comprise an aperture 42 or a cap 44 for the broadband transducer assembly 10 to achieve broadband operation. It will be appreciated, however, that if an aperture 42 and/or a cap 44 are employed as part of or in connection with the acoustic structure 36, the additional load imparted between the transducer element 40 and the base 38 due to inclusion of either of these components will allow smaller DTT ratios to achieve broadband operation. When an aperture 42 and/or a cap 44 are employed as part of or in connection with the acoustic structure 36, useful DTT ratios range from about 4.5 to about 55, as shown in FIG. 8.

Figure 9:
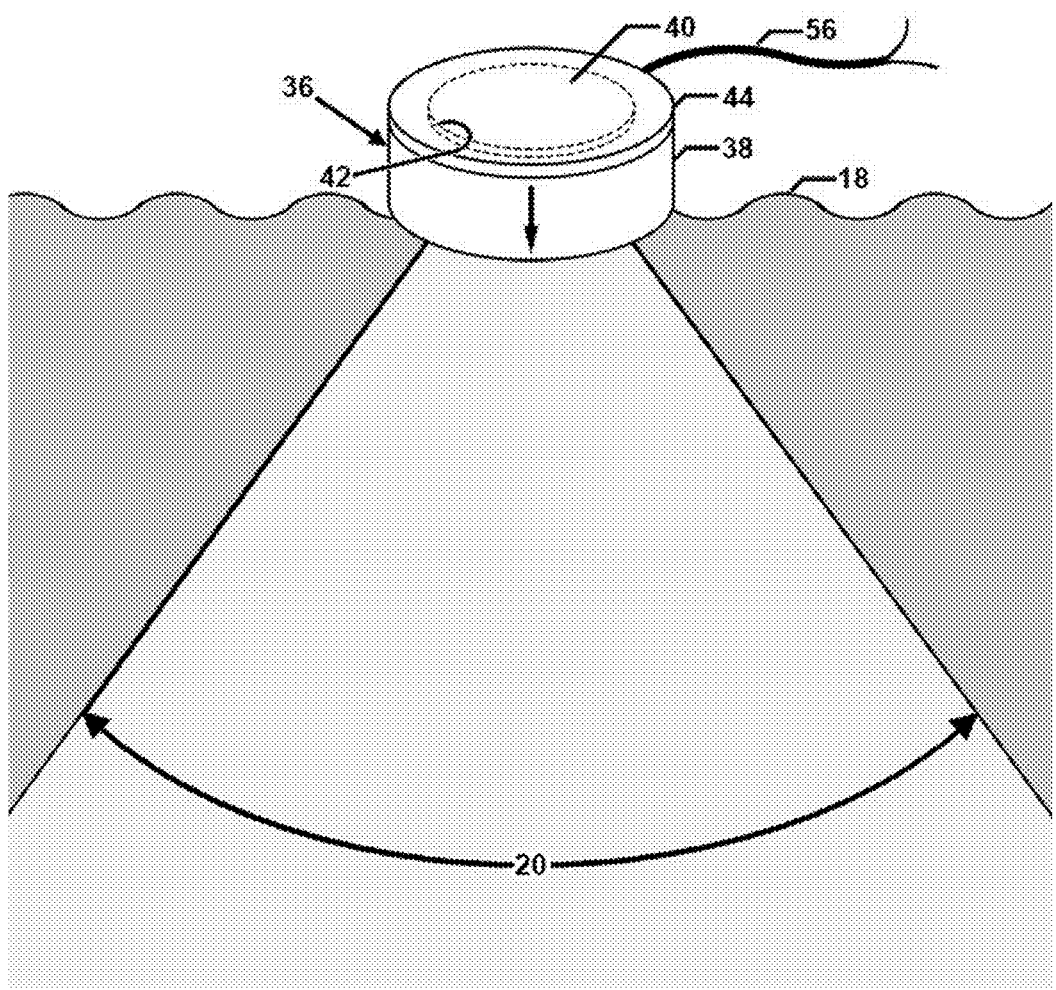
FIG. 9 illustrates a perspective view of an exemplary acoustic structure of the broadband transducer assembly of the present invention, propagating ultrasonic waves longitudinally through water.

Turning now to FIG. 9, and with continuing reference to FIGS. 6 and 7A through 7C, the operation of the broadband transducer assembly 10 will be described. FIG. 9 shows the transducer element 40 positioned within the acoustic structure 36, which is transmitting a sonar beam 20 into the water 18. The housing 24 is not shown for purposes of illustration. The transverse restraining forces on the transducer element 40 increase the load on the transducer element, thus broadening the bandwidth.

The accentuated transverse vibrations from the sufficiently thin transducer element 40 enable broadband operation of the transducer assembly 10. Additionally, the constriction of the transducer element 40 by the aperture 42 and cap 44 will constrict the transverse vibration of the transducer element, which causes loading between the transducer element and the acoustic structure, thus broadening the bandwidth of the acoustic structure. The amount of load created in these circumstances is dependent on a number of factors, including aperture 42 and cap 44 dimensions, construction materials and configuration. It will be appreciated that while the aperture 42 and/or cap 44 will load the transducer element 40, the use of a sufficiently thin transducer element 40 in conjunction with both the aperture 42 and/or cap 44 will provide more load than use of only one of the components alone. Thus, in a number of exemplary embodiments of the present invention, both an aperture 42 and cap 44 will be utilized with a sufficiently thin transducer element 40 to achieve enhanced broadband performance.

The transducer element 40 is connected with a sonar transmitter and a receiver (not shown) via a transducer cable 54. When a sonar pulse is applied to the transducer cable 54, the pulse, therefore, also is applied to the transducer element 40. The transducer element 40 then vibrates longitudinally or axially, and because it is sufficiently thin, it vibrates aggressively in the transverse or radial direction. These aggressive transverse vibrations are coupled into the acoustic structure 36 and resonate within the structure. Transverse and longitudinal resonances within the acoustic structure 36 then produce longitudinal vibrations that are coupled into the water and longitudinally as the transmitted sonar beam 20 through water 18. The longitudinal direction may also be referred to as the axial direction, while the transverse direction may also be referred to herein as the radial direction.

With continuing reference to FIG. 9, transverse vibrations from the transducer element 40 will couple into the base 38 and cause associated longitudinal vibrations within the acoustic structure 36. Different transverse and longitudinal resonance modes within the acoustic structure 36 are determined by the acoustic structure components, composition, shape, and dimensions. The composite result of these transverse and longitudinal resonances is realized longitudinally at the interface of the acoustic structure 36 with the bottom surface 28 of the housing 24 and, hence, to the water 18. The transmit sonar beam 20 is then emitted from the acoustic structure 36 and propagates through water in a longitudinal fashion.

Comparison of the transducer element of a conventional narrowband fishfinder transducer to the transducer element 40 of an embodiment of the present invention 10 demonstrates the following: 1) Longitudinal vibrations are the same in both; 2) transverse vibrations in the sufficiently thin transducer element 40 of the present invention are greatly accentuated over transverse vibrations of conventional narrowband fishfinder transducer elements.

Figure 10:
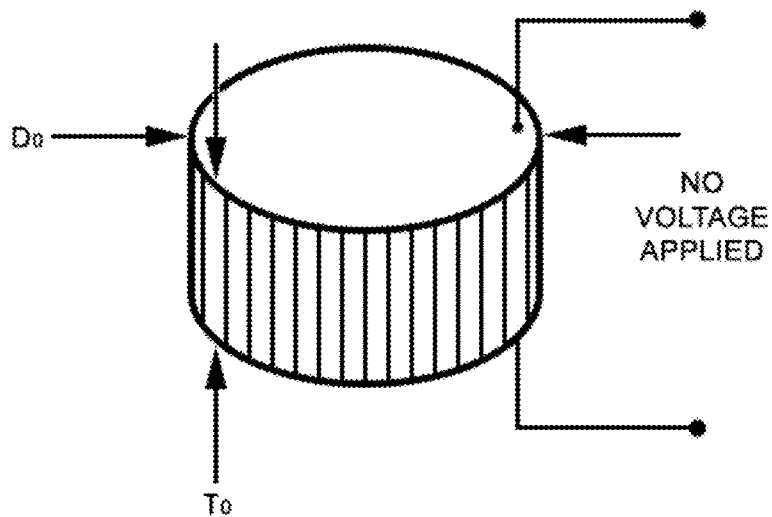
FIG. 10 illustrates a conventional narrowband transducer element, without voltage applied.
Figure 11:
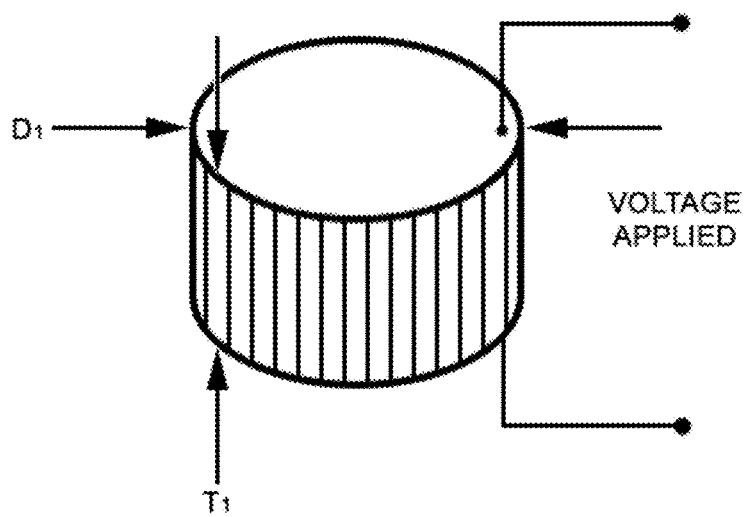
FIG. 11 illustrates a conventional narrowband transducer element in operation with voltage applied.
Figure 12:
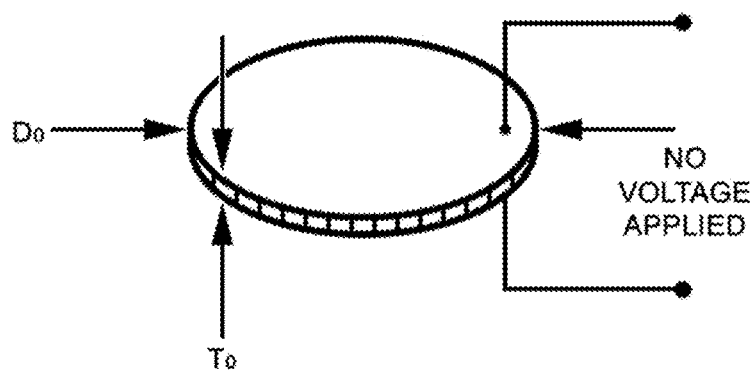
FIG. 12 illustrates an exemplary transducer element of the broadband transducer assembly of the present invention, without voltage applied.
Figure 13:
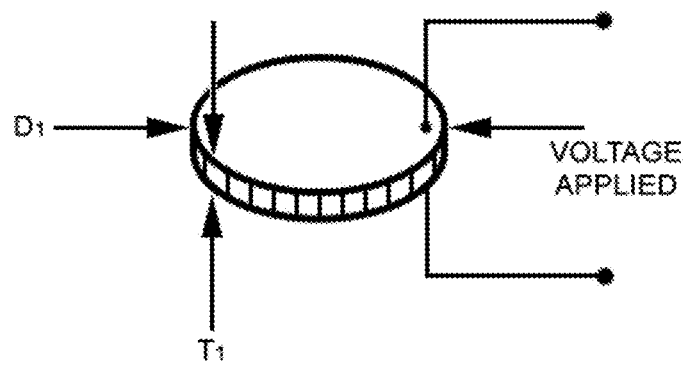
FIG. 13 illustrates an exemplary transducer element of the broadband transducer assembly of the present invention, in operation with voltage applied.

FIGS. 10 and 11 represent a transducer element of a conventional narrowband fishfinder transducer device. FIGS. 12 and 13 illustrate a sufficiently thin transducer element 40 of an embodiment of the present invention. Both transducer elements are made of the same normal, low-cost, hard PZT. Both elements have the same piezoelectric characteristics and the same initial diameter Do in the unexcited state, illustrated in FIG. 10 for the conventional transducer element and in FIG. 12 for the transducer element 40 of the present invention 10. However, with the application of an electric field, the transducer element 40 of the present invention in an excited state has a greater length change in the transverse direction than the conventional transducer element, as illustrated in FIG. 11 and FIG. 13.

In general, the change in length of a transducer element due to an applied electric field is shown in EQ 1:

$$\Delta L = d_{ij} \times E \times L_0 \qquad \text{EQ 1:}$$

Where:
$L_0$=Initial length (m)
$d_{ij}$=piezoelectric charge constant (pm/V)
E=applied electric field strength (V/m)

Since PZT has different piezoelectric charge constants based on orientation to the polarization vector, we arrive at EQ 2 and EQ 3 to find the change in diameter and thickness of a PZT element due to an applied electric field.

$$\Delta D = d_{31} \times E \times d_0 \qquad \text{EQ 2:}$$

$$\Delta T = d_{33} \times E \times t_0 \qquad \text{EQ 3:}$$

Where:
$T_0$=Initial diameter (m)
$T_0$=initial thickness (m)
$d_{31}$=piezoelectric charge constant orthogonal to the polarization vector (pm/V) E=applied electric field strength (V/m)
$d_{33}$=piezoelectric charge constant parallel to the polarization vector (pm/V)

Since the electric field is applied over the initial thickness of the element, E is derived as follows:

$$E = V/T_0 \qquad \text{EQ. 4:}$$

Based on established properties for hard PZT, using EQ. 2 and EQ 3. and applying a 600V electric field, the difference in the transverse length for the conventional transducer element and the sufficiently thin transducer element 40 of the present invention is calculated.

TABLE 1

|  | Conventional Narrowband Transducer Element Figures 10-11 | Present Invention Transducer Element Figures 12-13 |
|---|---|---|
| Unexcited Diameter ($D_0$) | 25.4 mm | 25.4 mm |
| Unexcited Thickness ($T_0$) | 11.2 mm | 2.0 mm |
| $d_{33}$ | | $5 \times 10^{-10}$ m/V |
| $d_{31}$ | | $-2.3 \times 10^{-10}$ m/V |
| Applied Voltage (V) | | 600 V |
| E | V/$t_0$ = 600 V/.0112 m = 53571 V/m | V/$t_0$ = 600 V/.002 m = 300000 V/m |

TABLE 1-continued

|  | Conventional Narrowband Transducer Element Figures 10-11 | Present Invention Transducer Element Figures 12-13 |
|---|---|---|
| ΔD | $-2.3 \times 10^{-10} \frac{m}{V} * 53571 \frac{V}{m} * .0254\ m = -3.13 \times 10^{-7}\ m$ | $-2.3 \times 10^{-10} \frac{m}{V} * 300000 \frac{V}{m} * .0254\ m = -1.75 \times 10^{-6}\ m$ |
| ΔT | $5 \times 10^{-10} \frac{m}{V} * 53571 \frac{V}{m} * .0112\ m = 3.0 \times 10^{-7}\ m$ | $5 \times 10^{-10} \frac{m}{V} * 300000 \frac{V}{m} * .002\ m = 3.0 \times 10^{-7}\ m$ |

As shown by the calculations in Table 1, both transducer elements in FIGS. 11 and 13 have the same longitudinal length change due to an applied voltage, but the transducer element 40 of the present invention broadband transducer assembly 10 has 5.6 times greater length change in the transverse direction than the conventional narrowband transducer element. It will be appreciated that the calculations in Table 1 are a comparison of two specific transducer elements. As the DTT ratio of the sufficiently thin transducer element 40 is changed, so will the difference in transverse length change with respect to a conventional narrowband transducer element with a much smaller DTT ratio.

A typical measurement of transducer performance is Q Factor, which is defined as follows:

$$Q = f_c/\Delta f$$

Where:
$f_c$ = Center frequency of the bandpass
$\Delta f$ = Bandwidth

Figure 14A:
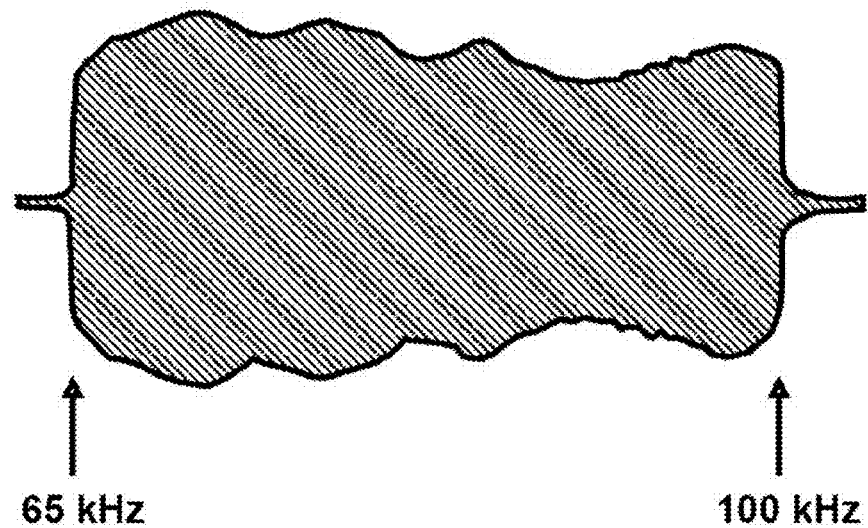
FIG. 14A is a graph illustrating bandpass characteristics of an exemplary broadband transducer assembly of the present invention.
Figure 14B:
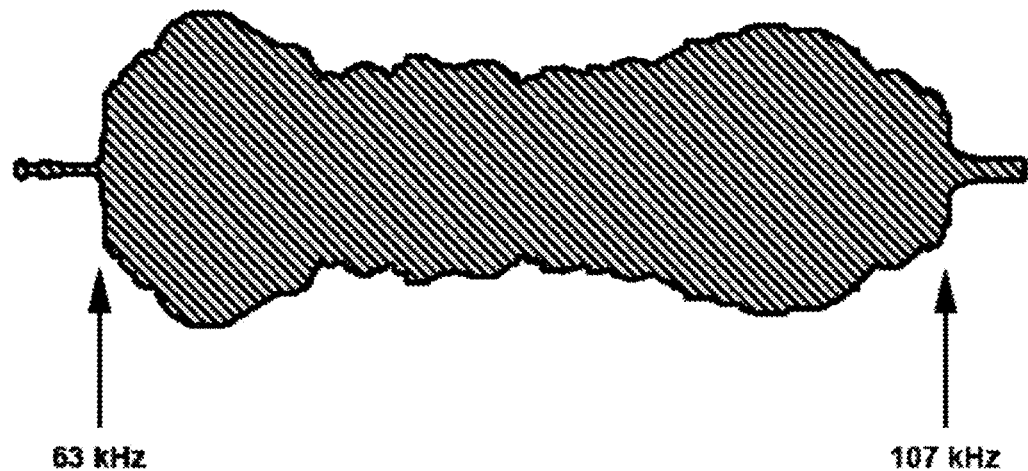
FIG. 14B is a graph illustrating bandpass characteristics of an alternative embodiment of an exemplary broadband transducer assembly of the present invention.
Figure 15:
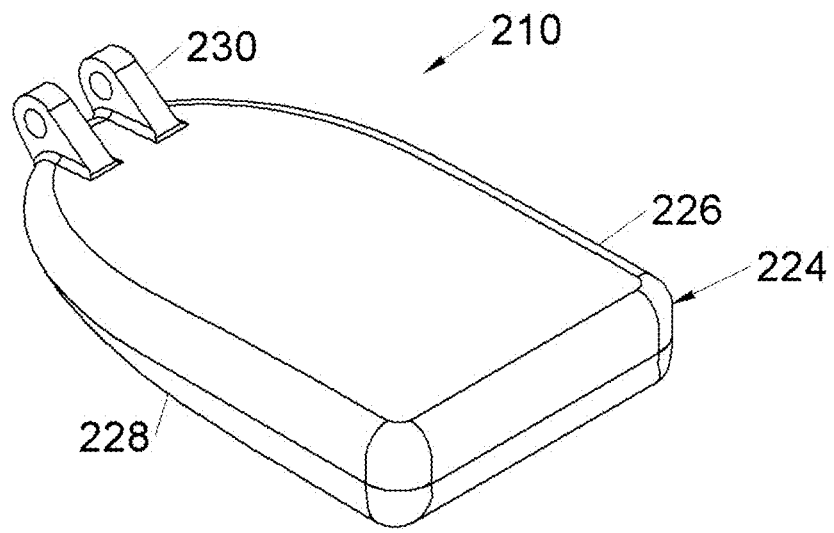
FIG. 15 is a perspective view of an exemplary broadband array transducer assembly of the present invention containing an array of four acoustic structures in the bottom section of a transducer housing.
Figure 16:
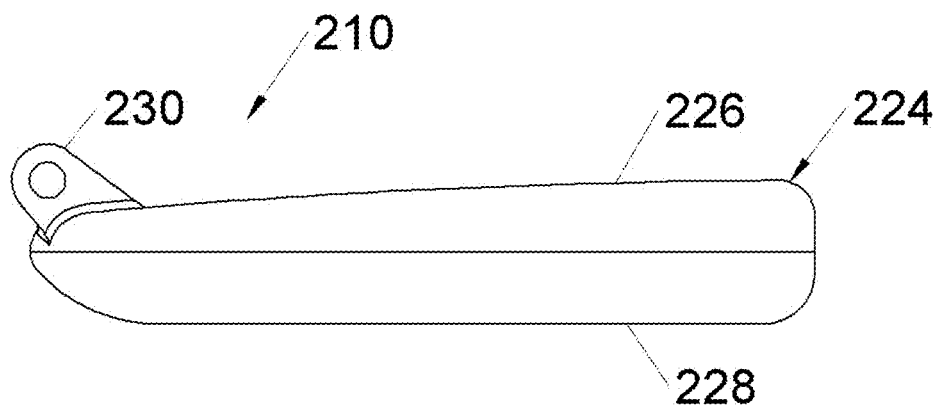
FIG. 16 is a side elevation view of the exemplary broadband array transducer assembly of FIG. 15.
Figure 17:
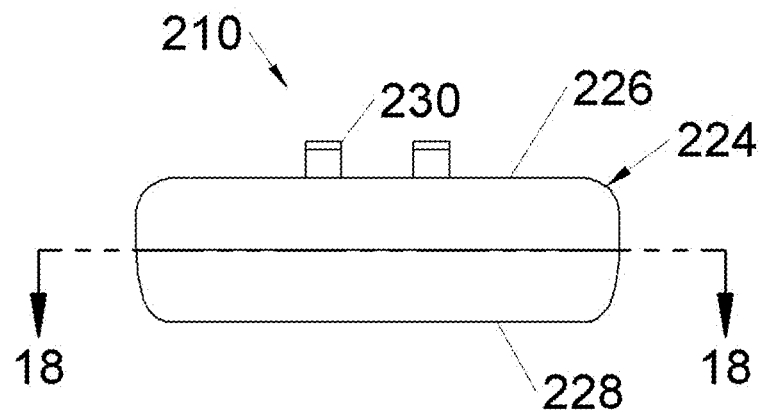
FIG. 17 is a rear elevation view of an exemplary broadband array transducer assembly of FIG. 15.

In general, transducer assemblies with a lower Q Factor are broader band. Table 2 contains a comparison of the Q Factor for a conventional narrowband transducer, typical low frequency broadband transducer, typical high frequency broadband transducer, with two embodiments of the broadband transducer assembly 10 of the present invention. While specific embodiments of the present invention will produce different performance, the measured bandpass of two embodiments substantially similar to that shown in FIGS. 2 through 4 and FIGS. 6 through 7C is represented in FIGS. 14A and 14B. Embodiment #1 has a usable bandwidth of 35 kHz with a center frequency of 82.5, while embodiment #2 has a usable bandwidth of 44 kHz with a center frequency of 85 kHz. These embodiments compare favorably with conventional narrowband, conventional high frequency broadband and conventional low frequency broadband transducers, as shown in Table 2.

TABLE 2

|  | Conventional Narrowband Transducer Assembly | Conventional High Frequency Broadband Transducer Assembly | Conventional Low Frequency Broadband Transducer Assembly | Present Invention Broadband Transducer Assembly #1 | Present Invention Broadband Transducer Assembly #2 |
|---|---|---|---|---|---|
| $f_c$ (kHz) | 200 | 200 | 53.5 | 82.5 | 85 |
| Δf (kHz) | 12.5 | 100 | 23.0 | 35 | 44 |
| Q | 16.0 | 2.0 | 2.3 | 2.4 | 1.9 |

As demonstrated in Table 2 and FIGS. 14A and 14B, the present invention, though being significantly lower cost, is capable of broadband performance that is as good, if not better, than a typical higher cost broadband transducer assembly.

It will be appreciated that the present invention can be embodied in numerous ways. For example, the broadband transducer assembly may include a plurality of acoustic structures 36 with disk or plate-shaped transducer elements 40, a single acoustic structure 36 with a plate transducer element 40 or any other arrangement of one or more acoustic structures 36 using transducer elements 40 which are a disk, plate, rectangular, ellipse, or other profile.

Figure 18:
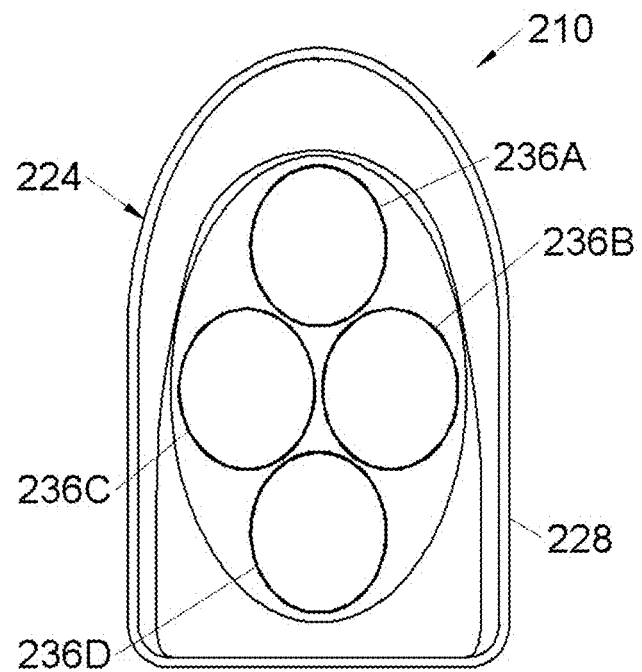
FIG. 18 is cross-sectional view of an exemplary broadband array transducer assembly of the present invention, taken along line 18-18 of FIG. 17.

Turning now to FIGS. 15 through 18, another embodiment of the present invention is illustrated therein. A broadband transducer assembly 210 comprises a housing 224 having a top surface 226 and bottom surface 228 and connector 230. As shown in FIG. 18, the broadband transducer assembly 210 comprises a plurality of acoustic structures 236A through 236D contained in an array arrangement within housing 224. Each of the plurality of acoustic structures 236A-236D comprises the elements of the acoustic structure 36 heretofore described. Each of the plurality of acoustic structures 236A through 236D could be operated individually or in a group of two or more to provide multiple transducer cone angles for use in either shallow or deep water. Other embodiments of a broadband array transducer could include acoustic structures 36 and transducer elements 40 of various sizes to achieve multiple frequencies and combinations of cone angles within the same transducer housing.

The present invention further comprises a method of using a broadband transducer assembly in a marine environment. The transducer element 40 is connected with a sonar transmitter and a receiver via a transducer cable 54 as heretofore described. When a sonar pulse is applied to the transducer cable 54, the pulse is transmitted to the transducer element 40, which then vibrates longitudinally, or axially. Because the transducer element 40 is sufficiently thin, it vibrates aggressively in the transverse, or radial, direction. These aggressive transverse vibrations are coupled into the acoustic structure 36 and resonate within the acoustic structure, producing longitudinal vibrations. The vibrations emitted from the acoustic structure 36 propagate longitudinally through the housing 24 and into the water 18.

When the aperture 42 and or cap 44 are incorporated, vibrations from the transducer element 40 cause loading between the transducer element and the other components of the acoustic structure 36, broadening the band width of the transducer assembly 10.

The invention of this application has been described above both generically and with regard to specific embodiments.

Although the invention has been set forth in what is believed to be preferred embodiments, a wide variety of alternatives known to those of skill in the art can be selected within the generic disclosure. Changes may be made in the combination and arrangement of the various parts, elements, steps and procedures described herein without departing from the spirit and scope of the invention as defined in the following claims.

We claim:

1. An acoustic structure operable for the purpose of imaging in marine applications, the acoustic structure having a quality factor (Q) and a bandwidth associated with the quality factor (Q), the acoustic structure comprising:
a sufficiently thin transducer element for transmitting and receiving acoustic signals, the transducer element having a transverse resonant frequency and a diameter and a thickness and wherein the ratio of the diameter of the transducer element to the thickness of the transducer element ("DTT ratio") ranges from 4.5 to 75;
a base to which the sufficiently thin transducer element is securable;
wherein the sufficiently thin transducer element produces transverse vibrations which result in loading of the transducer element and wherein the loading of the transducer element results in broadening of the bandwidth of the acoustic structure so that the acoustic structure has a quality factor (Q) of 5 or less; and
wherein the bandwidth of the acoustic structure includes the transverse resonant frequency of the transducer element.

2. The acoustic structure of claim 1 further comprising a housing, wherein the base of the acoustic structure is integrally formed with the housing.

3. The acoustic structure of claim 1 further comprising a cap.

4. The acoustic structure of claim 1 wherein the base further defines an aperture for receiving the transducer element.

5. The acoustic structure of claim 1 further comprising a component positioned above the base, wherein the component defines an aperture for receiving the transducer element.

6. The acoustic structure of claim 4 further comprising a cap.

7. The acoustic structure of claim 1 further comprising a housing having a bottom surface, wherein the acoustic structure is bonded to the bottom surface of the housing.

8. The acoustic structure of claim 1 wherein the transducer element is piezoelectric.

9. The acoustic structure of claim 8 wherein the transducer element is comprised of a material selected from the group consisting of lead zirconium titanate or barium titanate.

10. The acoustic structure of claim 1 wherein the center frequency of the broadband ranges from about 20 kHz to about 250 kHz.

11. The acoustic structure of claim 1 wherein the shape of the acoustic structure is substantially elliptical.

12. The acoustic structure of claim 1 wherein the base of the acoustic structure is comprised of Acrylonitrile Butadiene Styrene (ABS).

13. The acoustic structure of claim 1 wherein the acoustic structure is comprised of a material selected from the group consisting of ABS, nylon, polyethylene, polystyrene, polyvinylchloride, polypropylene, epoxy resin, vinyl ester resin, polyester resin, acrylic, delrin, polycarbonate, ultem and combinations thereof.

14. The acoustic structure of claim 1 wherein the transducer element is a disk having diameter and thickness.

15. The acoustic structure of claim 1 wherein the transducer element is a plate having length, width, and thickness.

16. The acoustic structure of claim 1 further comprising a housing that is constructed of materials selected from the group consisting of urethane, rubber, polyethylene, polystyrene, nylon, acrylic, polyvinylchloride ultem, acrylonitrile butadiene styrene plastic, polypropylene, epoxy resin, vinyl ester resin, polyester resin, delrin, polycarbonate, brass, bronze, steel, aluminum and combinations thereof.

17. The acoustic structure of claim 1 further comprising a housing and an isolation material within the housing to acoustically isolate the acoustic structure.

18. The acoustic structure of claim 1 further comprising a housing material and a potting material.

19. The acoustic structure of claim 1 wherein the transducer element comprises a magnetostrictive material.

20. The acoustic structure of claim 1 wherein the vibrations from the transducer element produce a sonar beam and the acoustic structure is positioned so that the sonar beam is emitted generally perpendicular to the surface of water.

21. The acoustic structure of claim 1 wherein the acoustic structure further comprises a sonar transmitter, a sonar receiver and a transducer cable.

22. The acoustic structure of claim 1 further comprising a connector for connecting the acoustic structure to a watercraft.

23. A transducer assembly operable for the purpose of imaging in marine applications, the transducer assembly comprising:
an acoustic structure having a quality factor (Q) and a bandwidth associated with the quality factor (Q);
a base; and
a sufficiently thin transducer element having a transverse resonant frequency and a diameter and a thickness and wherein the ratio of the diameter of the transducer element to the thickness of the transducer element ("DTT ratio") ranges from 4.5 to 75;
wherein the sufficiently thin transducer element is securable to the base of the acoustic structure; and
wherein the sufficiently thin transducer element produces transverse vibrations which result in loading of the transducer element and wherein the loading of the transducer element results in broadening of the bandwidth of the acoustic structure so that the acoustic structure has a quality factor (Q) of 5 or less.

24. The transducer assembly of claim 23 further comprising a housing, wherein the base of the acoustic structure is integrally formed with the housing.

25. The transducer assembly of claim 23 wherein the acoustic structure further comprises a cap.

26. The transducer assembly of claim 23 wherein the base further defines an aperture for receiving the transducer element.

27. The transducer assembly of claim 23 further comprising a component positioned above the base, wherein the component defines an aperture for receiving the transducer element.

28. The transducer assembly of claim 23 further comprising a cap.

29. The transducer assembly of claim 23 further comprising a housing having a bottom surface, wherein the acoustic structure is bonded to the bottom surface of the housing.

30. The transducer assembly of claim 23 wherein the transducer element is piezoelectric.

31. The transducer assembly of claim 30 wherein the transducer element is comprised of a material selected from the group consisting of lead zirconium titanate or barium titanate.

32. The transducer assembly of claim 23 wherein the center frequency of the broadband ranges from about 20 kHz to about 250 kHz.

33. The transducer assembly of claim 23 wherein the shape of the acoustic structure is substantially elliptical.

34. The transducer assembly of claim 23 wherein the base of the acoustic structure is comprised of Acrylonitrile Butadiene Styrene (ABS).

35. The transducer assembly of claim 23 wherein the acoustic structure is comprised of a material selected from the group consisting of ABS, nylon, polyethylene, polystyrene, polyvinylchloride, polypropylene, epoxy resin, vinyl ester resin, polyester resin, acrylic, delrin, polycarbonate, ultem and combinations thereof.

36. The transducer assembly of claim 23 wherein the transducer element is a disk having diameter and thickness.

37. The transducer assembly of claim 23 wherein the transducer element is a plate having length, width, and thickness.

38. The transducer assembly of claim 23 further comprising a housing that is constructed of materials selected from the group consisting of urethane, rubber, polyethylene, polystyrene, nylon, acrylic, polyvinylchloride ultem, acrylonitrile butadiene styrene plastic, polypropylene, epoxy resin, vinyl ester resin, polyester resin, delrin, polycarbonate, brass, bronze, steel, aluminum and combinations thereof.

39. The transducer assembly of claim 23 further comprising a housing and an isolation material within the housing to acoustically isolate the acoustic structure.

40. The transducer assembly of claim 23 further comprising a housing material and a potting material.

41. The transducer assembly of claim 23 wherein the transducer element comprises a magnetostrictive material.

42. The transducer assembly of claim 23 wherein the vibrations from the transducer element produce a sonar beam and the transducer assembly is positioned so that the sonar beam is emitted generally perpendicular to the surface of water.

43. The transducer assembly of claim 23 further comprising a sonar transmitter, a receiver for receiving signals from the transmitter and a transducer cable.

44. The transducer assembly of claim 23 further comprising a connector for mounting the transducer assembly to a watercraft.

45. A method of imaging marine environments, the method comprising the steps of:

transmitting an acoustic signal into a sufficiently thin transducer element, the sufficiently thin transducer element having a diameter and a thickness and wherein the ratio of the diameter of the transducer element to the thickness of the transducer element ("DTT ratio") ranges from 4.5 to 75; and producing transverse vibrations of the sufficiently thin transducer element and thereby loading the sufficiently thin transducer element to produce a quality factor (Q) of 5 or less.

46. The method of claim 45 further comprising the step of producing a sonar beam from the sufficiently thin transducer element and transmitting the sonar beam into the marine environment.

47. The method of claim 46 further comprising the step of emitting the sonar beam into the marine environment at any angle.

48. The method of claim 45 further comprising the step of transmitting a signal into a plurality of sufficiently thin transducer elements and vibrating the plurality of sufficiently thin transducer elements transversely.

49. The method of claim 48 further comprising the step of vibrating the plurality of sufficiently thin transducer elements in one or more groups.

50. The method of claim 48 further comprising the step of vibrating the plurality of sufficiently thin transducer elements individually.

51. The method of claim 45 further comprising the step of transmitting the vibrations from the sufficiently thin transducer element through the base of an acoustic structure and through a housing to which the acoustic structure is secured.

52. The method of claim 45 further comprising the step of receiving acoustic signals from the marine environment.

53. The method of claim 48 wherein the center frequency of the broadband ranges from about 20 kHz to about 250 kHz.

54. The method of claim 45 further comprising the step of enhancing broadband operation by at least partially covering the transducer element with a cap.

55. The method of claim 45 further comprising the step of enhancing broadband operation by at least partially enclosing the transducer element within the sidewalls of an aperture.

* * * * *